United States Patent Office 2,936,291
Patented May 10, 1960

2,936,291
CATALYSTS AND CATALYTIC PREPARATIONS

Edwin F. Peters, Lansing, and Bernard L. Evering, Chicago, Ill., assignors to Standard Oil Company, Chicago, Ill., a corporation of Indiana No Drawing. Application September 5, 1957
Serial No. 682,091

19 Claims. (Cl. 252—431)

This invention relates to novel catalysts which are useful in hydrocarbon conversions and to processes for the manufacture of said catalysts.

One object of our invention is to provide solid catalysts by contacting an oxide of a metal of Group 5a of the Mendeléeff Periodic Table with a solution of a soluble hydrocarbon aluminum compound in an inert solvent, such as a saturated or aromatic hydrocarbon or mixtures, in specified ratios under defined conditions. The solid catalysts are usually produced as powdered or colloidal dispersions in inert liquid media such as various hydrocarbons or equivalent solvents. Another object of our invention is to provide techniques for the preparation of said solid catalysts in a state of high activity. These and other objects of our invention will be apparent from the description and claims made herein.

Briefly, we have discovered that new solid compositions which are highly active catalysts for many purposes can be prepared by contacting an oxide of a metal of Group 5a of the Mendeléeff Periodic Table, viz. an oxide of vanadium, niobium or columbium, or tantalum with a solution of a trihydrocarbon aluminum or dihydrocarbon aluminum hydride in an inert solvent. The aluminum compounds which are used can be characterized by the formula $AlR_3$, wherein R is selected from the class consisting of hydrogen and a monovalent hydrocarbon radical, said aluminum compound containing at least two of said hydrocarbon radicals. These aluminum compounds are readily handled as solutions in inert solvents such as liquid or liquefied hydrocarbons, particularly saturated or aromatic hydrocarbons or mixtures of two or more individual hydrocarbons of the same or different homologous series. The minimum concentration of aluminum compound in the solution is usually at least about 5 millimols per liter of solution, but it will be understood that the concentration of the aluminum compound can be varied as desired in individual catalyst preparations. The group 5a metal oxide is substantially dehydrated, i.e. stripped of bound water or surface-bound hydroxyl groups, at some stage of manufacture precedent to contacting with the hydrocarbon aluminum compound. Water and surficial hydroxyl radicals in the group 5a metal oxide and/or catalyst supporting material react with the hydrocarbon aluminum compound. The hydrocarbon aluminum compound and group 5a metal oxide are contacted in molar ratio of at least about 0.1, usually between about 1 and about 10, with sufficient agitation to effect thorough contacting. The contacting is effected at temperatures of at least about −80° C. and below the temperature at which substantial thermal decomposition of the specific hydrocarbon aluminum compound occurs. Usually temperatures in the range of about 20° C. to about 200° C. are employed, preferably about 50° C. to about 175° C. Ordinarily, contacting can be effected simply at room temperature. The contacting period will depend to some extent on the other variables employed and the process of catalyst manufacture, especially the selected temperature and molar ratio of reactants, but is usually at least about 5 minutes and not necessarily greater than about 24 hours, usually about ½ to about 6 hours. The catalyst can be employed as a dispersion in the solvent employed for the hydrocarbon aluminum compound. Additional solvent can be added in the course of the contacting procedure to control temperature and for other reasons. The original solvent can be separated from the catalyst and replaced by another solvent. The catalyst can be stored as a dispersion in solvent in an inert atmosphere before use, preferably at low temperatures. Illustrations of our invention in greater detail are set forth hereinafter, together with illustrative examples of some uses of the new catalysts in hydrocarbon conversion processes.

The oxide catalyst ingredients employed in the present invention are derivatives of metals of group 5a (transition series members) of the periodic table, viz. V, Cb and Ta. The group 5a oxides may be used without supports and may be pentoxides. The metal oxides are best used in substantially anhydrous form, i.e., they are substantially free of occluded water molecules or hydroxyl groups bound to the surface of the 5a oxide or its supporting material. Substantial dehydration can be effected by known methods such as heating the supported or unsupported group 5a metal oxides to an elevated temperature in the range of about 100 to about 600° C. in air or gases as $N_2$, $NH_3$, He or the like, which can be passed over said oxides as a continuous water-stripping stream during the heating procedure.

The 5a oxides are preferably extended upon suitable supports and may be at least partially pre-reduced to sub-pentavalent metal oxides before use and preferably before contact with the hydrocarbon aluminum compound. The oxides employed in the present invention can comprise $V_2O_5$, $VO_2$, $V_2O_3$, VO; $Cb_2O_5$, $CbO_2$, CbO; $Ta_2O_5$, $TaO_2$ and the like. We prefer to employ oxides of vanadium.

The catalytic activity of group 5a metal oxide catalysts is maximized by maximum exposure of surface to the reaction mixture. To this end it is sometimes desired to extend the group 5a metal oxide upon suitable high area supports (for example, between about 100 and about 500 square meters per gram), for example, activated carbon or the difficultly reducible metal oxides such as alumina, titania, zirconia, silica, synthetic aluminosilicates, clays and the like. In some instances it may be desired to employ a relatively low surface area support, of which a variety are known in the art, including tabular alumina, various fused silicates, silicon carbide, diatomaceous earths; various metals, preferably treated to produce a relatively thin surface coating of the corresponding metal oxide thereon, such as iron or steel containing a slight iron oxide coating or aluminum carrying a surface coating of aluminum oxide. We may also employ relatively high surface area, relatively non-porous supports or carriers for the group 5a metal oxide such as kaolin, zirconium oxide, iron oxide pigments or the like. We can also employ relatively non-porous, low surface area supports, e.g. inorganic salts such as NaCl, NaF, $NH_4Cl$ or the like.

The relative proportion of support to the catalytic metal oxide is not critical and may be varied throughout a relatively wide range. The usual metal oxide:support ratios are in the range of about 1:20 to 1:1, or approximately 1:10. We can employ metal oxide catalysts composed of a supporting material containing about 1 to 50 w. percent, preferably about 5 to 35 w. percent, or approximately 10 w. percent, of vanadia or other group 5a catalytic metal oxide supported thereon, based on the total weight of the composition.

The supported or unsupported group 5a metal oxide can be used as formed pellets, granules or microspheres. Usually it is used as a powder in the range of about 10 to about 300 mesh per inch. The catalytic reactivity increases with decreasing particle size, so that in many cases the preferred range of particle sizes is between about 60 and about 200 mesh per inch.

The group 5a metal oxide can be incorporated in the catalyst support in any known manner, for example, by impregnation, coprecipitation, co-gelling and/or absorption techniques which are well known in the catalyst art. A brief review of the art of preparing supported vanadium oxide catalysts is presented in "Catalysis" edited by Dr. Paul H. Emmett (published by Reinhold Publishing Corp., N.Y. (1954), vol. 1, pages 328–9). Similar preparative methods can be employed to produce catalysts comprising oxides of columbium and tantalum, or catalysts comprising oxides of more than one group 5a metal.

In order to maximize the catalyst activity and reduce the requirements of the hydrocarbon aluminum compounds, it is preferable to effect partial reduction of catalysts comprising group 5a metal pentoxide before use in the polymerization process. The partial reduction and conditioning treatment of the solid metal oxide catalysts is preferably effected with hydrogen although other reducing agents such as carbon monoxide, mixtures of hydrogen and carbon monoxide (water gas, synthesis gas, etc.), sulfur dioxide, hydrogen sulfide, dehydrogenatable hydrocarbons, etc. may be employed. Hydrogen can be employed as a reducing agent at temperatures between about 350° C. and about 850° C., although it is more often employed at temperatures within the range of 450° C. to 650° C. The hydrogen partial pressure in the reduction or conditioning operation can be varied from subatmospheric pressures, for example even 0.1 pound (absolute), to relatively high pressures up to 3000 p.s.i.g., or even more. The simplest reducing operating may be effected with hydrogen at about atmospheric pressure.

Reducing gases such as carbon monoxide and sulfur dioxide may be used under substantially the same conditions as hydrogen. Dehydrogenatable hydrocarbons are usually employed at temperatures of at least about 450° C. and not above 850° C. Examples of dehydrogenatable hydrocarbons are acetylene, methane and other normally gaseous paraffin hydrocarbons, normally liquid saturated hydrocarbons, aromatic hydrocarbons such as benzene, toluene, xylenes and the like, normally solid polymethylenes, polyethylenes or paraffin waxes, and the like.

The AlR$_3$ compounds which can be used in practising our invention include compounds conforming to the general formula:

wherein R$_1$, R$_2$ and R$_3$ may be the same or different monovalent radicals selected from the class consisting of hydrogen and monovalent hydrocarbon radicals, but not more than one of said radicals is hydrogen. Examples of suitable R groups include an aryl radical, aliphatic hydrocarbon radical or derivative, such as Alkyl, cycloalkyl-alkyl, cycloalkenyl-alkyl, aryl-alkyl, cycloalkyl, alkyl-cycloalkyl, aryl-cycloalkyl, cycloalkyl alkenyl, alkenyl, alkynyl, alkyl-aryl or cycloalkyl-aryl radicals, etc.

Specific examples of R groups for substitution in the above formula include

Methyl, ethyl, n-propyl, isopropyl, isobutyl, n-amyl, iso-amyl, hexyl, n-octyl, n-dodecyl, and the like;
2-butenyl, 2-methyl-2-butenyl, allyl and the like;
Alkynyl, such as acetylenyl, propargyl and the like;
Cyclopentyl-methyl, cyclohexyl-ethyl, cyclopentyl-ethyl, methylcyclopentyl-ethyl, 4-cyclohexenylethyl and the like;
2-phenylethyl, 2-phenylpropyl, α-naphthyl-ethyl, methyl-naphthylethyl, and the like;
Cyclopentyl, cyclohexyl, 2,2,1-bicycloheptyl, and the like;
Methylcyclopentyl, dimethylcyclopentyl, ethylcyclopentyl, methylcyclohexyl, dimethylcyclohexyl, ethylcyclohexyl, isopropylcyclohexyl, 5-cyclopentadienyl and the like;
Phenylcyclopentyl, phenylcyclohexyl, the corresponding naphthyl derivatives of cycloalkyl groups, and the like;
Phenyl, tolyl, xylyl, ethylphenyl, xenyl, naphthyl, methyl-naphthyl, dimethylnaphthyl, ethylnaphthyl, cyclohexyl-phenyl and other AlR$_3$ compounds of the type disclosed and suggested in German Patent 878,560.

Specifically, by way of illustration, we can employ various trialkyl aluminum compounds and dialkyl aluminum hydrides such as dimethyl aluminum hydride, trimethyl aluminum, triethyl aluminum, diethyl aluminum hydride, tri-n-propyl aluminum, di-n-propyl aluminum hydride, triisopropyl aluminum, diisopropyl aluminum hydride, triisobutyl aluminum, diisobutyl aluminum hydride, ethyl diisobutyl aluminum, di-n-propyl isobutyl aluminum, trinonyl aluminum, tridecyl aluminum, tridodecyl aluminum, trihexadecyl aluminum, trioctadecyl aluminum and mixtures thereof and the like.

Particularly suitable inert solvents for the hydrocarbon aluminum compounds are various classes of hydrocarbons or their mixtures which are liquid under the conditions of catalyst manufacture and are substantially inert under said conditions. Certain classes of aliphatic hydrocarbons can be employed as solvents in the present process of catalyst manufacture. Thus we may employ various liquid or liquefied saturated hydrocarbons (alkanes and cycloalkanes). Either pure alkanes or cycloalkanes or commercially available mixtures, freed of catalyst poisons, may be employed. For example, straight run naphthas, mineral spirits or kerosenes containing alkanes and cycloalkanes can be used. Specifically, we may employ liquid or liquefied alkanes such as propane, butane, isobutane, n-pentane, n-hexane, 2,3-dimethylbutane, n-octane, iso-octane (2,2,4-trimethylpentane), n-decane, n-dodecane; cyclohexane, methylcyclohexane, dimethylcyclopentane, ethylcyclohexane, Decalin, methyldecalins, dimethyldecalins and the like.

Mineral spirits is a carefully fractionated naphtha which we have treated with 98% and then with fuming (30% SO$_3$) sulfuric acid, neutralized and percolated with silica gel, then stored over bright sodium wire. The boiling range was 335–375° F. and the product was a mixture of alkanes and cycloalkanes, essentially free of alkenes and aromatic hydrocarbons.

Members of the aromatic hydrocarbon series, particularly the mononuclear aromatic hydrocarbons, viz., benzene, toluene, xylenes, mesitylene and xylene-p-cymene mixtures can also be employed. Tetrahydronaphthalene can also be employed. In addition, we may employ such aromatic hydrocarbons as ethylbenzene, isopropylbenzene, sec-butylbenzene, t-butylbenzene, ethyltoluene, ethylxylenes, hemimellitene, pseudocumene, prehnitene, isodurene, diethylbenzenes, isoamylbenzene and the like. Suitable aromatic hydrocarbon fractions can be obtained by the selective extraction of aromatic naphthas, from hydroforming operations as distillates or bottoms, from cycle stock fractions of cracking operations, etc.

We may also employ certain alkyl naphthalenes which are liquid under the polymerization reaction conditions, for example, 1-methylnaphthalene, 2-isopropylnaphthalene, 1-n-amylnaphthalene and the like, or commercially produced fractions containing these hydrocarbons.

We may also employ a liquid hydrocarbon reaction medium comprising liquid olefins, e.g., n-hexenes, cyclohexene, octenes, hexadecenes and the like.

The liquid hydrocarbon reaction medium should be freed of poisons before use in the present invention by acid treatment, e.g. with anhydrous p-toluenesulfonic acid, sulfuric acid, or by equivalent treatments, for example with aluminum halides, or other Friedel-Crafts catalysts, maleic anhydride, calcium, calcium hydride, sodium or other alkali metals, alkali metal hydrides, lithium aluminum hydride, hydrogen and hydrogenation catalysts (hydroforming or hydrofining), filtration through a column of copper grains or 8th group metal, etc., or by combinations of such treatments.

Various inert organic halogen compounds can also be used as solvents for the hydrocarbon aluminum compounds, e.g., completely halogenated alkanes such as $CF_2Cl$—$CF_2Cl$, $CFCl_2$—$CF_2Cl$, $CCl_4$ and the like; partially halogenated alkanes such as $CH_2Cl_2$ and $CHCl_3$; inert halogenated aromatic hydrocarbons such as chlorobenzene, fluorobenzene and the like, or mixture thereof.

The catalysts of this invention are reactive with oxygen, water, carbon dioxide, sulfur compounds, acetylene, allene; basic organic and inorganic oxygen and nitrogen compounds, and the like. The catalysts should be shielded from these materials as much as possible during preparation, before use in catalytic conversion and during catalytic conversion. Thus the catalysts are prepared, stored and used in an inert atmosphere such as the inert gases; pure, dry gaseous alkanes and the like.

We have not yet succeeded in identifying the catalysts as particular chemical individuals or complexes (stoichiomers) because their extreme reactivity limits the application of analytical techniques and the interpretation of analytical data.

The practical minimum concentration of the hydrocarbon aluminum compound in solvent is about 5 millimols per liter, but can be a much higher concentration, e.g. about 50 millimols per liter of solution or even more. Usually the concentration range of hydrocarbon aluminum compound in the solution is about 5 to about 20 millimols per liter of solvent.

Various techniques of contacting the solution of hydrocarbon aluminum compound with the group 5a metal oxide can be employed. Following are illustrations of various techniques of contacting. The metal oxide, usually in the form of a fine powder, is introduced with stirring into the solution of aluminum compound while maintaining a desired temperature or temperature range by conventional methods; the metal oxide can be added continuously or in one or more batches. Another contacting method involves the preparation of a slurry or colloidal dispersion of the metal oxide in an inert solvent and the addition of this slurry or dispersion to the aluminum compound solution with agitation and temperature control. In an inverse addition technique, the solution of aluminum compound is added slowly with stirring and temperature control to a slurry or colloidal dispersion of the metal oxide in an inert solvent. An additional method which can be used is to introduce the metal oxide into the solution of aluminum compound in a ball mill or colloid mill or other grinding apparatus. These and other contacting methods, which will suggest themselves to one skilled in the art, can be used for the purposes of our invention. The contacting of aluminum compound and metal oxide can be effected in situ in the reactor, so that no transfer of catalyst is thereafter required. Optionally, the contacting of aluminum compound and metal oxide can be effected in the presence of one or more of the compounds which will thereafter be subjected to catalytic conversion with the resultant catalyst; particularly, contacting can be effected in the presence of alkenes such as ethylene, propylene or butylene.

The ultimate molar ratio of aluminum compound to metal oxide employed for the preparation of catalysts should be at least about 0.1; more often the range of about 1 to about 10 is employed, preferably the range of about 2 to about 6. The temperature of contacting is usually at least about 0° C. and lower than temperatures at which substantial thermal decomposition of the specific aluminum compound occurs. Usually temperatures within the range of about 20 to about 200° C. can be used, preferably about 50 to about 175° C. or about room temperature. The contacting, as indicated above, is effected in an inert gaseous atmosphere or in an environment which is filled with inert liquid solvent. The pressure of inert gas which can be employed is usually at least about atmospheric pressure, to prevent leakage of oxygen and water vapor into the contacting system, but higher pressures up to about 100 to 200 p.s.i.g. can be used, although they are not usually necessary. The time of contacting can be at least about 5 minutes and is ordinarily within the range of about 15 minutes to about 4 hours. Usually the rate of interaction of the aluminum compound and metal oxide is high at room temperature or elevated temperatures, so that contacting periods in the range of even less than 1 minute to about 10 minutes can be conveniently employed.

The contacting of the group 5a metal oxide and the hydrocarbon aluminum compound results in some chemical interaction and/or complexing of the reactants. Thus in typical cases, the initial pale color of the metal oxide is observed to change or deepen to dark brown or black upon contact with the hydrocarbon aluminum solution and more or less hydrocarbon gas is evolved. Thus in some instances it was noted that one mol of triisobutyl aluminum reacts with one mol of $V_2O_5$ (carried upon a silica gel support) and that the reaction evolved one mol of gases which contained isobutane and isobutylene. To some extent, reduction of the valence state of the metal of the group 5a metal oxide occurs and the solid catalyst composition contains hydrocarbon-metal bonds, apparently hydrocarbon-aluminum and possibly, also, hydrocarbon-group 5a metal. The interaction is still more obscure when it occurs in the presence of an added olefin.

One desirable method of preparing catalysts involves (1) contacting the group 5a metal oxide catalyst component with an amount of the hydrocarbon aluminum compound in excess of that required for complete reaction with the group 5a metal oxide (and catalyst support, if one is present) at the temperature of catalyst preparation, (2) thereafter separating the solution containing unreacted hydrocarbon aluminum compounds from the treated oxide, (3) followed by washing the treated oxide with a solvent for the hydrocarbon aluminum compound in one or more stages to effect substantially complete removal of unbound or unreacted hydrocarbon aluminum compound contained in the treated group 5a metal oxide. In some instances it has been found that catalyst prepared by this method, the so-called "Back Wash" method, exhibits optimum activity for use in the polymerization of normally gaseous olefins to form normally solid polymers. Catalysts prepared by this technique have also been found in some instances to yield higher molecular weight polymers of gaseous n-alkenes than are obtained from catalysts otherwise prepared.

The catalysts of this invention can be employed for the polymerization of alpha olefins in the $C_2$—$C_{10}$ range, particularly the polymerization of alkyl ethylenes and isoalkyl ethylenes such as propylene, 1-butene, isopropyl ethylene, 4-methylpentene, 5-methylhexene or the like, e.g. styrene or nuclear derivatives of styrene. Both homopolymerization and copolymerization can be effected with these catalysts, usually at temperatures within the range of about 50° C. to about 230° C. and pressures ranging upwardly from atmospheric to any desired maximum pressure, usually between about 200 and about 5000 p.s.i.g. or about 500 to 1000 p.s.i.g.

The new solid compositions produced according to this invention can be employed for the hydrogenation of various alkenes, e.g. diisobutylene and/or other polymers or copolymers, at temperatures in the range of about 30° C. to 200° C. with hydrogen under pressures between about 200 and 2000 p.s.i.g. or even more.

In view of the high reactivity of the solid compositions produced by the present process, they can be used effectively to remove sulfur compounds and other polar compounds from hydrocarbon fractions such as naphthas, particularly in the last stage of the refining of such hydrocarbon oils to remove traces of organic compounds containing oxygen, nitrogen or sulfur to final values below 10 p.p.m.

The following examples are illustrative of our invention but are not intended to function as undue limitations thereof:

Example 1

The following method of catalyst preparation was used:

(1) dissolve 87.5 g. of $NH_4VO_3$ (Fisher) in 4200 ml. of distilled water at 80–88° C. and then filter (additional $H_2O$ may be necessary for solution);

(2) add 375 g. of $SiO_2$ (Davison, grade 70 (140 A. d.)—60–200 mesh) to the filtrate while mixing;

(3) evaporate in a rotating evaporator at 75–80° C. under vacuum (aspirator) until a free-flowing yellow mixture results;

(4) sieve this product through a #48 screen;

(5) evaporate the sieved product under 1–2 mm. Hg at 60° C. in a rotating evaporator for 2 hours;

(6) calcine the deep yellow, dry product in a rotating kiln in the presence of nitrogen and/or gaseous ammonia for about 3.5 hours. The resultant product is 12.3 w. percent $V_2O_5$ on wide-pore silica gel. The catalyst was prepared from the vanadia and used in propylene polymerization as follows.

Prior to use, 5 g. of the vanadia-on-silica was weighed out in air and transferred to a vertical calcining tube wherein it was heated to 250° C. for one-half hour while dry nitrogen was passed therethrough. The vanadia was allowed to cool under nitrogen to room temperature.

A 250 ml. stainless steel rocker bomb was charged under a nitrogen atmosphere with 50 cc. of pure, dry n-heptane which had been stored over sodium wire. A solution of commercial triisobutyl aluminum in dry, purified mineral spirits (Hercules Co.) (containing a small proportion of diisobutyl aluminum hydride), stored under nitrogen, was transferred by the use of a dry syringe into the rocker bomb. Then 5 g. of the vanadia-on-silica was charged to the bomb. The bomb was then purged with nitrogen and sealed. The molar ratio of triisobutyl aluminum to $V_2O_5$ and 0.8. The bomb was heated in 20 minutes to 115° C. without rocking, then 100 cc. of liquid propylene was charged and rocking started and continued for 1.5 hours. Rocking was then stopped and hot gases were vented therefrom to reach atmospheric pressure. The reactor was then cooled in water to room temperature and opened. The contents of the reactor were extracted with hot xylenes and a commercial antioxidant was added to the xylenes solution (0.5 g. of Ionol, registered trademark, which is 2,6-di-t-butyl para-cresol). The extraction yielded 4 liters of polymer in boiling xylene, which was filtered through paper on an electrically-heated funnel. The filtrate was allowed to cool to room temperature overnight before filtering off the xylene-insoluble polymer. The xylene-insoluble polymer was washed on the filter with fresh xylene, and treated in a Waring Blendor with acetone to remove xylene. The polymer was dried at 70° C. under nitrogen. The xylene-soluble polymer solution was concentrated to about 150 cc. volume, cooled, and poured slowly into 2 liters of acetone with stirring. The xylene-soluble polymer was separated from acetone by evaporating the acetone and dried at 90–105° C. under nitrogen. The polymerization reaction was found to yield 2.2 g. of normally solid polypropylenes per g. of solid catalyst, of which approximately half was highly crystalline polypropylene insoluble in xylenes at room temperature. The specific viscosity of the xylenes-insoluble polypropylene was 0.75, measured at the concentration of 0.2 g. of polymer in 100 cc. of Decalin at 130° C.

Example 2

The group 5a metal oxide composition was 17 weight percent $V_2O_5$ supported upon an activated alumina carrier. It was prepared as follows: 100 ml. of distilled water was brought to boiling and then 33.2 g. of oxalic acid and 15.6 g. of $V_2O_5$ were added. The $V_2O_5$ was added over the course of about one hour, yielding a soluble green aqueous complex. The solution was filtered hot and then poured over 76.5 g. of ⅛-inch pills of activated (gamma-) alumina. The mixture was evaporated to dryness with stirring and then calcined at about 510° C. and atmospheric pressure for 12 hours.

A steel rocker bomb of about 300 ml. capacity was charged with 20 g. of the metal oxide-alumina composition. The reactor was also charged with 105 g. of benzene and 49 g. of ethylene. Aluminum trimethyl (2.0 g.) was introduced into the reactor in a sealed glass vial, which was broken beneath the surface of the benzene solvent. Polymerization was effected at temperatures which were varied during the operation from 25° C. to 104° C. and ethylene pressures varying from 300 to 1000 p.s.i. The total contact period was 4 hours. Although there was no apparent diminution in catalytic activity at the end of 4 hours, it became necessary to shut down the reactor because it was plugged with a solid polymer of ethylene and it became difficult to supply ethylene even at 1000 p.s.i. Accordingly, ethylene supply was discontinued, the reactor was allowed to cool to room temperature and gases were vented therefrom to atmospheric pressure. The reactor was found to be packed with a tough, white, solid polymer of ethylene, 34 g., having a melt viscosity of $1.4 \times 10^8$ (Method of Dienes and Klemm, J. Appl. Phys. 17, 458–78 (1946)) and sendsity (24/24° C.) of 0.9756. Analysis of the reaction mixture showed that none of the ethylene had been converted to normally gaseous or normally liquid products.

The high molecular weight, extremely high density polyethylenes have high tensile and impact strengths and minimized capacity to absorb odors, flavors and various solvents. They open a new field of uses for polyethylenes in many attractive applications, such as in carboys or other packaging means, plastic pipe, etc.

Vanadia compositions alone under the above operating conditions or, in fact, over a broad range of operating conditions, do not effect the conversion of ethylene to a normally solid polymer. Aluminum trimethyl alone is likewise ineffective for the conversion of ethylene to a normally solid polymer under the above operating conditions. The catalysts produced by the contacting of the $AlR_3$ and metal oxide components produced striking and unexpected results, viz. high conversion rates and solid polymers. Furthermore the solid polymers have an almost unbranched structure, high crystallinity and high molecular weight.

Example 3

A rocking autoclave was charged with 9 g. of powdered commercial $V_2O_5$, used without any supporting material. The $V_2O_5$ had been calcined at 600° C. and atmospheric pressure for 12 hours before use. The reactor charge also comprised 102 g. of benzene, 2.9 g. of aluminum trimethyl and 46 g. of ethylene. The reactor contents were heated to 115° C. under 1000 p.s.i. of ethylene for a total contacting period of 3 hours. The reaction products were worked up as in Example 2. The reaction yielded 38 g. of a solid polymer of ethylene. No gaseous or liquid products were produced.

Example 4

The process of Example 2 is repeated but 2 g. of aluminum triphenyl are substituted for aluminum trimethyl. The reaction products are worked up as before to yield a white, tough, solid polymer from ethylene.

Example 5

The process of Example 2 is repeated but the metal oxide catalyst is 10 weight percent of $Cb_2O_5$ supported upon activated alumina. The products are worked up as before to yield a tough, solid, white polymer of ethylene.

Example 6

The process of Example 2 is repeated but 10 weight percent of $Ta_2O_5$ supported upon activated alumina is substituted in equal parts by weight for the vanadia-alumina catalyst of Example 2. The reaction mixture is worked up as in Example 2 to separate and recover normally solid polyethylenes.

Examples 7 and 8

A vanadia-on-silica composition was prepared by dissolving 62 g. of commercial purified ammonium metavanadate in 2816 cc. of distilled water at 80 to 85° C. Then 551 g. of commercial large pore silica (140 A d.) was added to the hot ammonium metavanadate solution and the mixture was evaporated at 75 to 80° C. under water aspirator pressure. At this point the water aspirator was replaced with a vacuum pump and drying was continued for 12 hours at 60° C. under 1 mm. Hg pressure. The relatively dry composition was then calcined in air in a rotating furnace at 450° C., for 2 hours, flushed with dry nitrogen for 15 minutes at 450° C. and then cooled and bottled under dry nitrogen of high purity. Analysis of this composition showed a $V_2O_5$ content of 7.5 w. percent.

Catalysts derived from the vanadia-on-silica and triisobutyl aluminum were used to polymerize ethylene and propylene, respectively, to form high molecular weight solid polymers. The reactions were carried out in a 300 cc. mild steel rocking bomb. The bomb was charged with 70 cc. of mineral spirits, 0.76 g. of triisobutyl aluminum, and 3.3 g. of the 7.5 w. percent $V_2O_5$—$SiO_2$. The bomb contents were heated with rocking from 28° C. to 125° C. over 30 minutes, after which 60 g. of propylene or 800 to 1000 p.s.i.g. of ethylene pressure was maintained. The reactions were allowed to continue for 2 hours at 125° C. When propylene was charged, 14.8 g. of solid polymer were obtained. When ethylene was charged, 43.4 g. of solid polymer were obtained.

Example 9

Examples 7 and 8 were repeated with propylene, except that in the polymerization step everything was charged to the bomb at 28° C. and then the mixture was heated to 85° C. The total contact time was 2.25 hours. In this operation, 15.2 g. of solid propylene polymer were obtained.

Example 10

An 8.1 w. percent vanadia-on-silica-alumina composition was prepared in the following manner. Seventy grams of oxalic acid dihydrate was dissolved in 200 cc. of boiling distilled water. Then 31.6 g. of $V_2O_5$ was slowly added to this hot solution over a period of 30 minutes. The resulting blue solution was filtered hot and diluted up to 250 cc. volume. This solution contains about 0.126 g. $V_2O_5$ per cc. Fourteen cc. of this solution was diluted further to 40 cc. with distilled water and then poured over 20 g. of $SiO_2$—$Al_2O_3$ which had been steamed at 1200° F. for 6 hours. The

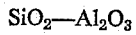

contained about 30 w. percent $Al_2O_3$. The resulting mixture was evaporated to dryness with stirring on a hot plate to a weight of 24.5 g. This composition was then calcined in air in a muffle furnace at 375 to 400° C. for 1 hour.

An isomerization of 1-butene was then carried out in the following manner. Three grams of the calcined composition was charged to a dry 300 cc. rocking bomb, after which was charged 5.0 of triisobutyl aluminum solution in n-heptane containing 1.06 g. of the Al compound. The bomb was then sealed, heated to 70° C. and then 95 g. of 98 mol percent 1-butene was charged. The contents of the bomb were heated further to 115° C. and maintained at this temperature for 16 hours. The following analysis of the reaction products was obtained:

|  | Mol percent |
|---|---|
| Isobutane | Trace |
| Isobutene | 1.4 |
| 1-butene | 16.4 |
| n-Butane | Trace |
| Trans-2-butene | 30.5 |
| Cis-2-butene | 51.7 |
| Total | 100.0 |

Example 11

A composite containing 12.3 w. percent of vanadium (calculated as $V_2O_5$) was prepared by impregnation of commercial silica gel (pore diameter, 140 A) with an aqueous solution of ammonium vanadate, followed by drying, then conditioning in an ammonia atmosphere at 450° C. for 4 hours. The conditioned composite (5 g.), 50 cc. of pure dry n-heptane and 1.63 g. of triisobutyl aluminum were brought together and maintained at 27° C. for 20 minutes. Thereafter the solid material was washed three times with 50 cc. portions each of pure dry n-heptane to remove excess triisobutyl aluminum. It was found that the molar ratio of triisobutyl aluminum consumed per mol of vanadium oxide (calculated as $V_2O_5$) was 1.6.

A 187 cc. rocking bomb was then charged with 5 g. of the solid catalyst produced by the above method and 50 cc. of pure dry n-heptane and was heated from 27° C. to 115° C. in 15 minutes. Then 50 g. of propylene was charged and the reaction temperature was maintained for 1.5 hours. The maximum autogenic pressure was about 400 p.s.i.g. The reaction yielded 0.8 g. of oil and grease-like polymers, 5.5 g. of xylene-soluble polymers and 5.5 g. of polypropylenes insoluble in xylenes at room temperature. The xylene-insoluble polypropylene had a density (24/4° C.) of 0.9050 and specific viscosity of 0.796 as determined upon a solution of 0.2 g. of the polymer in 100 ml. Decalin at 130° C.

This application is a continuation-in-part of our application for United States Letters Patent, Serial No. 493,073, filed March 8, 1955.

Having thus described our invention, what we claim is:

1. A solid composition produced by contacting a solid material consisting essentially of an oxide of a metal of Group 5a of the Mendeléeff Periodic Table with a solution, in an inert solvent, of a hydrocarbon aluminum compound having the formula $AlR_3$, wherein R is selected from the class consisting of hydrogen and monovalent hydrocarbon radicals, said aluminum compound containing at least two of said hydrocarbon radicals, the molar ratio of said aluminum compound to said Group 5a metal oxide being at least about 0.1.

2. The composition of claim 1 wherein said oxide is an oxide of vanadium and said aluminum compound is a trihydrocarbon aluminum.

3. The composition of claim 1 wherein said oxide is an oxide of vanadium and said aluminum compound is a trialkyl aluminum.

4. The composition of claim 1 wherein said oxide is vanadium pentoxide and said aluminum compound is triisobutyl aluminum.

5. The composition of claim 1 wherein said oxide is extended upon a substantially inert catalyst support.

6. A solid catalyst produced by contacting a solid material consisting essentially of a calcined pentavalent oxide of a metal of Group 5a of the Mendeléeff Periodic Table with a solution, in an inert solvent, of a hydrocarbon aluminum compound having the formula $AlR_3$, wherein R is selected from the class consisting of hydrogen and monovalent hydrocarbon radicals, said aluminum compound containing at least two of said hydrocarbon radicals, the molar ratio of said aluminum compound to said Group 5a metal oxide being at least about 0.1.

7. The catalyst of claim 6 wherein said oxide is partially reduced by treatment with a reducing gas before said contacting.

8. The catalyst of claim 6 wherein said oxide is partially reduced by treatment with hydrogen at a temperature between about 400° C. and about 600° C. before said contacting.

9. The catalyst of claim 6 wherein said calcined pentavalent oxide is extended upon a major proportion by weight of a difficultly reducible metal oxide.

10. A process for the preparation of a solid catalyst which comprises contacting a solid material consisting essentially of an oxide of a metal of Group 5a of the Mendeléeff Periodic Table with a solution, in an inert solvent, of a hydrocarbon aluminum compound having the formula AlR$_3$, wherein R is selected from the class consisting of hydrogen and monovalent hydrocarbon radicals, said aluminum compound containing at least two of said hydrocarbon radicals, the molar ratio of said aluminum compound to said Group 5a metal oxide being at least about 0.1.

11. The process of claim 10 wherein said oxide is extended upon a substantially inert catalyst support.

12. The process of claim 10 wherein said solvent is an inert halogenated hydrocarbon.

13. The process of claim 10 wherein said solvent is an inert hydrocarbon.

14. The proces of claim 10 wherein said oxide is an oxide of vanadium and said aluminum compound is a trihydrocarbon aluminum.

15. The process of claim 10 wherein said oxide is vanadium pentoxide and said aluminum compound is triisobutyl aluminum.

16. A process for the preparation of a solid catalyst which comprises contacting a solid material consisting essentially of a calcined pentavalent oxide of a metal of Group 5a of the Mendeléeff Periodic Table with a hydrocarbon solution of a hydrocarbon aluminum compound having the formula AlR$_3$, wherein R is selected from the class consisting of hydrogen and monovalent hydrocarbon radicals, said aluminum compound containing at least two of said hydrocarbon radicals, the molar ratio of said aluminum compound to said Group 5a metal oxide being at least about 0.1.

17. The process of claim 16 wherein said oxide is partially reduced by treatment with a reducing gas before said contacting.

18. A process for the preparation of a solid catalyst, which process comprises contacting a solid material consisting essentially of an oxide of a metal of Group 5a of the Mendeléeff Periodic Table with a solution, in an inert solvent, of a hydrocarbon aluminum compound having the formula AlR$_3$, wherein R is selected from the class consisting of hydrogen and monovalent hydrocarbon radicals, said solution containing said aluminum compound in a molar ratio to said oxide exceeding 1.0, thereafter withdrawing said oxide from said contacting operation and washing said oxide free of extractable aluminum compound with an inert solvent for said aluminum compound.

19. The process of claim 16 wherein said calcined pentavalent oxide is extended upon a major proportion by weight of a difficultly reducible metal oxide.

References Cited in the file of this patent

UNITED STATES PATENTS

| | | |
|---|---|---|
| 2,699,457 | Ziegler | Jan. 11, 1955 |
| 2,727,024 | Field | Dec. 13, 1955 |
| 2,781,410 | Ziegler | Feb. 12, 1957 |